July 7, 1959 — A. H. KENT — 2,894,156
MINIATURE MOTOR
Filed Sept. 12, 1957
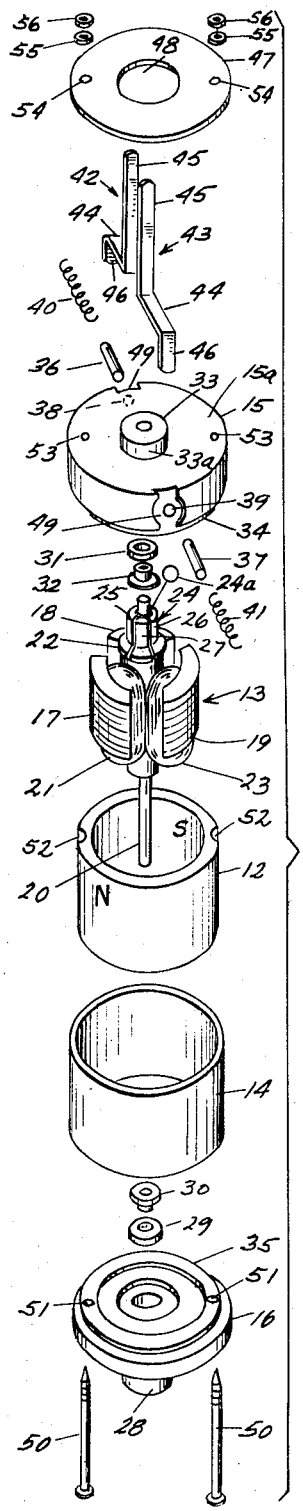
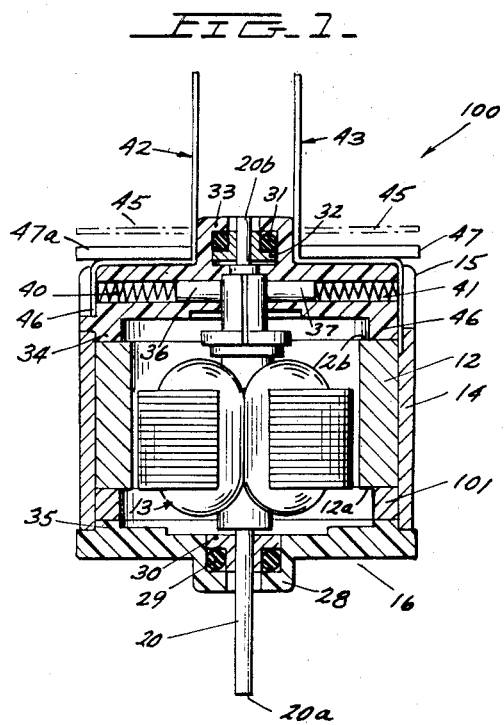
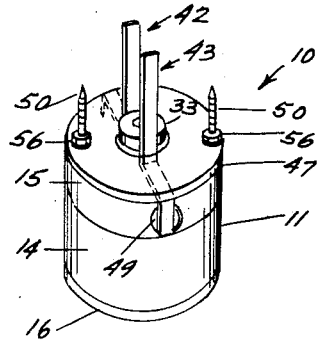
INVENTOR.
ALLEN H. KENT
BY
ATTORNEYS

United States Patent Office 2,894,156
Patented July 7, 1959

2,894,156

MINIATURE MOTOR

Allen H. Kent, New York, N.Y., assignor to Minitone, Inc., New York, N.Y., a corporation of New York Application September 12, 1957, Serial No. 683,641

3 Claims. (Cl. 310—154)

This application relates to electric motors in general and more particularly to miniature direct current motors of high efficiency and long life.

Appliances, office and automotive equipment as well as military applications often require inexpensive miniature motors. Prior art constructions to fulfill this need were usually limited to cheaply constructed motors used for toys or if the motors were rugged and reliable, the price thereof became extremely high.

This invention provides a construction for a D.C. miniature motor utilizing coil springs to bias the brushes into contact with the commutator segments rather than employing leaf springs which are a characteristic of an expensive motor. Coil springs are far superior to leaf springs for maintaining sufficient contact pressure between the brushes and armature even after the brushes are worn a considerable amount.

Even though coil springs are utilized, the motor of the instant invention includes a common fastening means whereby the end brackets of the motor housing as well as the contacts for conducting electric power to the brushes are all maintained in their respective places by means of a pair of studs and an insulating member thereby resulting in a speeded up production rate. This is in contrast to prior art motors wherein one fastening means was required to maintain the housing sections in place and individual fasteners were required to maintain the contacts electrically connected to the brushes.

Further, this construction enables the contacts to be positioned within the motor diameter which is highly desirable in hand held tools since the motor diameter is in the order of the size of a half dollar coin and the battery power supply is no larger in diameter.

A single element field piece comprising a permanent magnet ring shaped member of barium ferrite is utilized. The magnetic circuit which includes the field piece and an energized armature segment is completed by a steel ring which forms the central section of the motor housing. This steel ring also may be conveniently used as a grounding means for the motor.

The field piece is of sufficient magnetic strength to support the armature when the motor is mounted with its operating shaft in a vertical position. By properly positioning the field piece axially with respect to the lower end bracket all end thrust may be removed from the lower bearing thereby appreciably reducing friction losses and increasing the operating efficiency of the motor.

Accordingly, a primary object of this invention is to provide a highly efficient miniature motor which is inexpensive to construct and will have a life expectancy in the order of 1000 hours.

Another object is to provide a common fastening means whereby the end brackets and contacts of a D.C. motor utilizing coil springs for brush biasing may be maintained in their appropriate positions.

Still another object is to provide a miniature D.C. motor wherein the housing therefore includes a steel cylindrically shaped member which serves as a portion of the magnetic circuit including the field piece and energized armature segment and may also serve as a power supply terminal.

A further object is to provide a miniature motor wherein the field piece comprises a permanent magnet having a strength sufficient to support the weight of the armature and in which the field piece is so positioned that all end thrust is removed from and the armature caused to float above the lower shaft bearing when the motor is operated with the shaft in a vertical position.

A still further object is to provide a D.C. motor, utilizing coil springs to bias the brushes into contact with the commutator, wherein the contacts for conducting power to the armature are positioned within the motor housing diameter.

These as well as other objects of the instant invention shall become apparent after reading the following description of the accompanying drawings in which:

Figure 1 is a longitudinal cross section of a miniature motor constructed according to the principles of this invention.

Figure 2 is an exploded perspective view of a miniature D.C. motor constructed in accordance with the principles of this invention.

Figure 3 is a perspective view of the assembled miniature motor of Figure 2.

Referring to the figures, miniature motor 10 is of the direct current type and comprises a housing 11 wherein field piece 12 and armature 13 are disposed. Housing 11 comprises a hollow cylindrical central section 14 of steel and end brackets 15, 16 of an insulating material. Field piece 12 is a permanent magnet preferably constructed of barium ferrite which enables the field piece to be molded and thereby eliminates the necessity for a critical grinding operation.

Armature 13 includes armature segments 17—19 symmetrically disposed about motor output shaft 20. Individual windings 21—23 are provided to energize armature segments 17—19 respectively. Windings 21—23 are electrically connected to the appropriate segments 25—27 of commutator 24, which are imbedded in nylon core 24a, in a manner well known to the art. Core 24a insulates commutator segments 25—27 from each other as well as from shaft 20.

End bracket 16 includes bearing cup 28 wherein resilient ring member 29 and bearing 30 are disposed. Similarly resilient ring member 31 and bearing 32 are disposed in cup 23 of end bracket 15. This construction provides self-alignment for armature 13 as well as providing means for the absorption of residual vibration. These features are highly desirable since the air gap between armature 13 and field piece 12 is extremely small. In some motor constructions end brackets 15, 16 are constructed of electrically conductive material and in that case resilient ring members 29, 31 may be appropriately shaped to insulate shaft 20 from end brackets 15, 16.

Brushes 36, 37 are disposed within passages 38, 39 respectively which extend radially from the outside of end bracket 15 toward the center thereof. Brushes 36, 37 are preferably comprised of a silver-graphite material which provides a commutator cleaning action and low friction. Coil springs 40, 41 are also disposed in passages 38, 39 respectively and are utilized to bias brushes 36, 37 respectively into engagement with commutator segments 25—27. Contacts 42, 43 are adapted to electrically connect motor 10 with a source of direct current energy.

Each contact 42, 43 is a generally Z-shaped member having a central portion 44 and end portions 45, 46. Central portions 44 are positioned against the flat surface 15a of end bracket 15 by means of insulating member 47 which includes a central opening 48 wherein bearing cup 33 is disposed. End portions 46 are disposed in end bracket depressions 49 which surround passages 38, 39 and abut the ends of coil springs 40, 41. Since motor 10 draws extremely low current coil springs 40, 41 are relied upon to complete the current paths between contacts 42, 43 and brushes 36, 37 respectively. In applications requiring the brushes to carry large currents a brass or copper bushing (not shown) may be inserted around the brush and coil spring to assure sufficient current carrying capacity. The other end portions 45 extend through opening 48 of insulating member 47 and about the outer curved surface 33a of bearing cup 33 thereby preventing lateral movement of contacts 42, 43.

Studs 50 extend longitudinally through motor 10 and are received by apertures 51 of end bracket 16, slots 52 in the outer surface of field piece 12, apertures 53 of end bracket 17, and apertures 54 of insulating member 47. Washers 55 and nuts 56 or other suitable gripping members are received by the threaded end of studs 50 to retain stud 50 in place.

Central section 14 of housing 11 surrounds embossments 34, 35 of end brackets 15, 16 respectively and thereby prevent lateral movement between these members. Relative rotational movement between field piece 12 and end brackets 15, 16 is prevented by studs 50 nesting in slots 52.

Thus, a common fastening means comprising insulating member 47, studs 50, and nuts 56 has been provided to retain all components of motor 10 in operative engagement. With this arrangement, contacts 42, 43 are confined within the overall lateral dimensions of housing 11. Studs 50 may extend from either end of motor 10 for conveniently securing motor 10 to a mounting plate (not shown).

It is to be noted that end portion 46 of contacts 43 is illustrated as being longer than end portion 46 of contact 42 so that contact 43 is electrically connected to steel casing 14 to provide a convenient power terminal (preferably negative), which may be utilized for switching purposes. End portions 45 of contacts 42, 43 may be set at any convenient angle as in the phantom position of Figure 1 according to other switching requirements. If steel housing section 14 is utilized as a ground terminal the portion of contact 43 extending above surface 47a of insulating member 47 may be severed.

Not only may steel ring 14 act as a power terminal but it serves as a major portion of the magnetic circuit including an energized armature segment 17—19 and ring magnet field piece 12. Field piece 12 is magnetized in the conventional manner, having diametrically opposed poles, and is preferably of sufficient strength to cause self centering of armature 13 within field piece 12 when motor 10 is operated with its shaft horizontally disposed.

Steel ring 14 is snugly fitted to field piece 12 to reduce the width of the air gap therebetween.

The miniature D.C. motor 100 illustrated in Figure 1 includes all the elements of motor 10. For convenience these elements are designated by the same reference numerals. Additionally Figure 1 includes a shim means 101 comprised of a non-magnetic material.

While armature 13 is extremely light, weighing approximately ½ ounce for a motor delivering 0.4 oz.-in. of torque, the magnetic force of field piece 12 is not sufficient to keep armature 13 centered therein when shaft 20 is positioned vertically even though field piece 12 is of sufficient strength to retain armature 13 in the approximate position illustrated. At this time armature 13 sags to the bottom end 12a of field piece 12.

Shim means 101 is inserted between bottom end 12a and embossment 35 of lower end bracket 16. In this position lower shaft bearing 30 is free of all end thrust of the type caused by armature weight in motors of the prior art. The elimination of end thrust on bearing 20 appreciably reduces the frictional losses of the motor which in a fractional horsepower motor are a substantial portion of the input power.

Motor 100 may be constructed having shaft end 20b elongated over that illustrated in Figure 1 and end bracket 15 correspondingly extended in the direction of the shaft axis. This will enable motor 100 to be operated with shaft 20 reversed 180° with respect to Figure 1 and by merely positioning shim means 101 between end 12b of field piece 12 and embossment 34 of bracket 15 armature 13 will float above the now lower bearing 32.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A miniature motor being comprised of a housing, a field piece, and an armature; said housing comprising an open ended central section and a pair of end brackets positioned over the ends of said central section; said armature including a shaft and a plurality of armature segments symmetrically disposed about said shaft; bearings mounted to each of said end bracket; said field piece and said armature being disposed within said housing; said field piece being interposed between said plurality of armature segments and said central section; said shaft being supported by said bearings and projecting through one of said end brackets beyond the confines of said housing; an individual winding associated with each of said plurality of armature segments; a commutator carried by said shaft in axial alignment therewith and electrically connected to said windings; a pair of brushes and individual coil springs biasing said brushes into engagement with said commutator; said commutator being of lesser diameter than said armature; said brushes and said coil spring extending radially from said commutator; an individual contact member in operative engagement with each of said coil springs; a common fastening means, including an insulating member, maintaining said contact members in operative engagement with said coil springs and securing said end brackets to said central section.

2. A miniature motor being comprised of a housing, a field piece, and an armature; said housing comprising an open ended central section and a pair of end brackets positioned over the ends of said central section; said armature including a shaft and a plurality of armature segments symmetrically disposed about said shaft; bearings mounted to each of said end bracket; said field piece and said armature being disposed within said housing; said field piece being interposed between said plurality of armature segments and said central section; said shaft being supported by said bearings and projecting through one of said end brackets beyond the confines of said housing; an individual winding associated with each of said plurality of armature segments; a commutator carried by said shaft in axial alignment therewith and electrically connected to said windings; a pair of brushes and individual coil springs biasing said brushes into engagement with said commutator; said commutator being of lesser diameter than said armature; said brushes and said coil spring extending radially from said commutator; an individual contact member in operative engagement with each of said coil springs; a common fastening means, including an insulating member, maintaining said contact members in operative engagement with said coil springs and securing said end brackets to said central section; said contacts being positioned within the boundaries determined by projecting the outer surface of said housing parallel to said shaft.

3. A miniature motor being comprised of a housing, a field piece, and an armature; said housing comprising an open ended central section and a pair of end brackets positioned over the ends of said central section; said armature including a shaft and a plurality of armature segments symmetrically disposed about said shaft; bearings mounted to each of said end bracket; said field piece and said armature being disposed within said housing; said field piece being interposed between said plurality of armature segments and said central section; said shaft being supported by said bearings and projecting through one of said end brackets beyond the confines of said housing; an individual winding associated with each of said plurality of armature segments; a commutator carried by said shaft in axial alignment therewith and electrically connected to said windings; a pair of brushes and individual coil springs biasing said brushes into engagement with said commutator; an individual contact member in operative engagement with each of said coil springs; a common fastening means maintaining said contact members in operative engagement with said coil springs and securing said end brackets to said central section; a first of said pair of end brackets including passages wherein said brushes and said coil springs are disposed; said first end bracket having an outwardly projecting cup wherein the bearing mounted to said first end bracket is disposed; said common fastening means comprising an insulating member, two pin members and means for retaining said pin members in place; each of said contacts including a central portion, a first and a second portion each offset in opposite directions from said central portion; said central portions being interposed between an outer surface of said first end bracket and said insulating member; said first portions bearing against said coil springs; said second portions extending through an opening in said insulating member surrounding said cup; said pin members extending through said pair of end brackets and said insulating member.

References Cited in the file of this patent

UNITED STATES PATENTS

| | | |
|---|---|---|
| 371,199 | Kimball et al. | Oct. 11, 1887 |
| 457,902 | Kintner | Aug. 18, 1891 |
| 2,177,472 | Barrett | Oct. 24, 1939 |
| 2,234,926 | Jepson | Mar. 11, 1941 |
| 2,278,489 | Rawlings | Apr. 7, 1942 |
| 2,532,700 | Eurich et al. | Dec. 5, 1950 |

FOREIGN PATENTS

| | | |
|---|---|---|
| 284,673 | Great Britain | Aug. 16, 1928 |
| 546,117 | Great Britain | June 29, 1942 |
| 738,127 | Great Britain | Oct. 5, 1955 |
| 781,107 | Great Britain | Aug. 14, 1957 |
| 1,124,954 | France | July 9, 1956 |